United States Patent [19]

Cheung

[11] Patent Number: 4,850,449
[45] Date of Patent: Jul. 25, 1989

[54] PIEZOELECTRIC SEISMIC VIBRATION DEVICE AND METHOD

[75] Inventor: Lim H. Cheung, Carrollton, Tex.

[73] Assignee: The Standard Oil Company, Cleveland, Ohio

[21] Appl. No.: 874,937

[22] Filed: Jun. 16, 1986

[51] Int. Cl.$^4$ .............................................. G01V 1/00
[52] U.S. Cl. ................................... 181/101; 181/102; 181/106; 181/113; 367/912; 310/334
[58] Field of Search ............... 181/101, 102, 104, 106, 181/108, 111, 113; 367/911, 912, 189, 157, 36, 37, 25; 73/152; 310/323, 328, 334

[56] References Cited

U.S. PATENT DOCUMENTS

| | | | |
|---|---|---|---|
| 1,966,446 | 7/1934 | Hayes | 172/126 |
| 3,061,037 | 10/1930 | Evans | 181/0.5 |
| 3,213,358 | 10/1919 | Piety | 324/10 |
| 3,298,456 | 1/1967 | Picou | 181/0.5 |
| 3,883,841 | 5/1975 | Norel et al. | 181/102 |
| 3,949,352 | 4/1976 | Vogel | 340/15.5 |
| 4,245,172 | 1/1981 | Shirley | 310/332 |
| 4,394,754 | 7/1983 | Waters | 367/75 |
| 4,491,759 | 1/1985 | Kunz et al. | 310/328 |
| 4,525,645 | 6/1985 | Shirley et al. | 310/337 |
| 4,651,044 | 3/1987 | Kompanek | 310/337 |
| 4,702,343 | 10/1987 | Paulsson | 181/106 |

OTHER PUBLICATIONS

"Downhole Periodic Seismic Sources", by H. C. Hardee, Geophysical Prospecting, 31: 57-71, 1983.
"High Frequency Seismic Source", Brochure issued by Southwest Research Institute, San Antonio, Texas, Publication date unknown.

Primary Examiner—Charles T. Jordan
Assistant Examiner—John W. Eldred
Attorney, Agent, or Firm—Raymond F. Keller; David J. Untener; Larry W. Evans

[57] ABSTRACT

A vibrator and method for transmitting seismic signals into the earth to obtain data on various subsurface characteristics. The vibrator is driven with piezoelectric transducers which can operate below 500 Hz, and can produce better signal resolution at higher frequencies than is possible with hydraulic vibrators. The piezoelectric vibrators can be used in various embodiments at the earth's surface, within a borehole, or while permanently buried in the earth.

12 Claims, 2 Drawing Sheets

PIEZOELECTRIC SEISMIC VIBRATION DEVICE AND METHOD

BACKGROUND

1. Field of the Invention

This invention relates to a device and method for transmitting seismic signals into the earth from a surface or subsurface location, in which the signal is produced by the vibration of a piezoelectric transducer. In one embodiment, the device can be operated with a borehole. In another embodiment, the device can be permanently buried at a subsurface location.

2. Discussion of the Art

Information about subsurface geological characteristics is routinely obtained by oil and gas exploration companies using seismic technology. A seismic energy source generates sound waves which are reflected and refracted as they pass through the earth. The signal is recorded at another location and analyzed.

Conventional methods for generating a seismic signal include explosives and vibrators. For example, detonation of dynamite in a hole can produce a single shock vibration. Truck-mounted heavy vibrators such as VIBROSEIS (trademark of Conoco) units are capable of multiple vibrations at controlled frequencies. For offshore exploration, gas exploders or other devices can be towed behind a boat.

Additional methods are available but are not in widespread commercial use. For example, U.S. Pat. No. 3,28,456 to Picou discloses a seismic wave generator in which the driving force is provided by a magnetic coil.

In addition to devices used on the earth's surface, downhole periodic seismic sources, such as a pneumatic oscillator discussed by H. C. Hardee ("Downhole Periodic Seismic Sources," *Geophysical prospecting*, 31: 57–71, 1983), have been proposed. Advantages include higher signal efficiency, improved resolution, and the capabilty for repetitive study of deep structures. Downhole periodic sources can be used with downhole geophones for improved vertical seismic profiling, or they can be used with surface receivers.

Existing seismic signal generators have not been completely satisfactory. Inefficiencies in hydraulic or pneumatic vibrators result in wasted energy and diminished signal resolution as signal frequency increases. There is a need for a signal generator which is easily controlled and which avoids the shortcomings of existing vibrators.

Piezoelectric transducers are not new to seismic prospecting; they are sometimes used in receivers for seismic signals known as accelerometers. Surface accelerometers are typically laid out in a spaced pattern some distance from the seismic source and have a short spike which is pushed into the soil to provide a firm coupling with the earth's surface. Vibration of the accelerometer causes vibration in a piezoelectric cyrstal, which generates a voltage in relation to the received signal.

Hydrophones, sensors adapted for receiving seismic signals through water, often incorporate piezoelectric transducers. Other examples of piezoelectric crystals converting mechanical energy to electrical energy are phonograph cartridges and microphones.

Piezoelectric crystals can also convert electrical energy to mechanical energy. Examples of such applications include sonar, fluid flow measurement, and ultrasonic jewelry cleaning baths. They have been used for dynamic positioning of observatory telescope mirrors and other large items.

The patent literature discloses other uses for piezoelectric crystals. U.S. Pat. No. 4,491,759 to Kunz et al, describes a piezoelectric vibration exciter for generating mechanical vibrations over a 20 kHz to 100 kHz frequency range for the purpose of non-destructive material testing. The piezoceramic disk stacks are mechanically connected to a test specimen, and the disks vibrate at the frequency of an applied AC voltage.

Ultrasonic piezoelectric transducers, designed to generate acoustical wave trains having frequencies of 50 kilocycles or more, and preferably greater than 100 kilocycles, are disclosed as useful in well logging in U.S. Pat. No. 3,949,352 to Vogel. A beam of ultrasonic energy is transmitted from the borehole to produce shear waves in the adjacent formation, and the return signal is monitored from another location in the same borehole.

U.S. Pat. No. 4,245,172 to Shirley describes an improved transducer using a plurality of piezoelectric elements in a bimorph condiguration for generating and detecting shear waves for the analysis of solid and semi-solid materials. The resulting displacement from this configuration is relatively high but the force is weak compared to other piezoelectric configurations.

It is an object of this invention to provide a more efficient seismic energy source by converting electrical energy directly into acoustic energy and to avoid energy disadvantages associated with hydraulic and pneumatic systems, such as heat loss through friction, viscosity, and turbulence, It is another object of this invention to conserve energy compared to seismic methods involving dropped or vibrating weights. Most of the energy expended in this invention by raising the weight is stored and reclaimed in the subsequent downward cycle, while in conventional hydraulic VIBROSEIS technology much energy is wasted as heat.

It is a further object of this invention to provide an efficient vibratory source signal that does not degrade at highe frequencies (e.g., above 100 Hz).

It is an additional object of this invention to produce a vibratory seismic device with dimensions and capabilities that would make it suitable for temporary or permanent placement in a borehole.

SUMMARY OF THE INVENTION

The invention relates to a vibrator device and method for transmitting seismic signals into the earth. The device comprises at least one piezoelectric transducer attached to a rigid plate, a means for applying pressure against the earth with the transducer and plate, and a means for supplying an electrical signal to the piezoelectric transducer.

In a preferred embodiment useful for generating seismic signals from the earth's surface, a transducer is mounted between a heavy mass and a base plate. In an alternate embodiment useful for generating seismic signals within a borehole, one or more piezoelectric transducers are attached to curve plates which are held in tension against the walls of the borehole. In another embodiment, a device can be buried permanently to provide an inexpensive seismic energy source from a fixed location on a periodic basis.

DETAILED DESCRIPTION

All embodiments of this invention involve one or more piezoelectric transducers for producing a vibration, together with a means for electrically energizing the transducer. The configuration of each device will vary depending upon whether it is designed for use on the earth's surface, within a borehole, or while permanently buried in the earth. The principal differences are found in the means for applying pressure against the earth.

Figure 1:
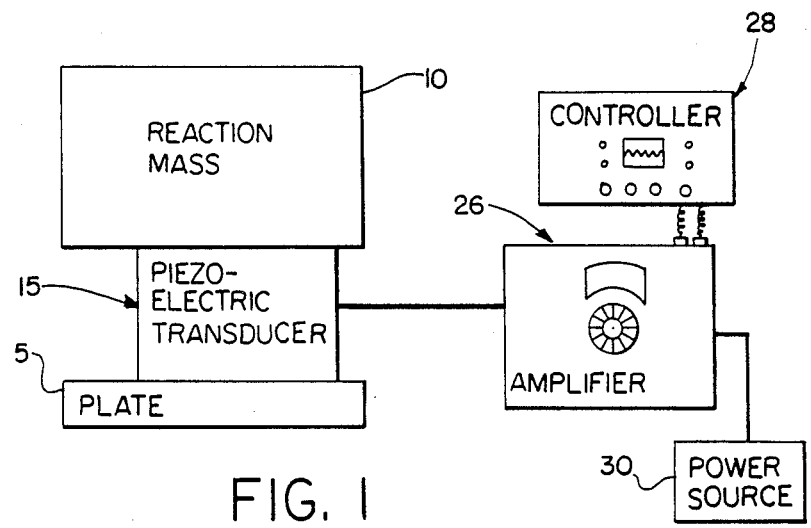
FIG. 1 is a diagrammatic depiction of the device showing the relationship of the components.

Referring to FIG. 1, one side of piezoelectric transducer 15 is placed adjacent to plate 5 which is in contact with the earth. On the opposite side of piezoelectric transducer 15 is part 10, which is a heavy reaction mass or other means for applying pressure against transducer 15 and plate 5 to resist movement. Such means can include mechanical and other devices to hold transducer 15 and plate 5 firmly against the earth, such as jacking and bracing devices to hold transducer 15 and plate 5 against the lateral walls of a borehole.

Signal controller 28, power amplifier 26, and power source 30 taken in combination are a typical means for supplying an electrical signal to transducer 15. In operation, a sine wave or other desired signal is generated by signal controller 28 and amplified by power amplifier 26 connected to power source 30 (e.g., a generator). The piezoelectric transducer 15 is wired to the amplifier 26 and expands when the energizing signal is applied. The transducer is preferably driven at a selected frequency to cause the heavy mass 10 to vibrate. The vibrating mass 10 results in a reactionary oscillating force transmitted to the earth through the base plate 5. The signal controller can be used to alter the frequency of the signal and, thereby, the frequency of the oscillating mass 10. A frequency sweeping signal, as known in the art, is preferred.

Transducers

The number, size, and type of piezoelectric transducers chosen will depend upon the needs of each application. The most appropriate transducer for this invention demonstrates vibration along a single axis when an electrical signal is applied, since the desired motion is in only one direction such as, for example, up and down.

Some piezoelectric crystals are designed to expand and vibrate in several directions simultaneously, such as discs which vibrate in a radial mode. Bimorph elements, for example, bend out of a plane because of their orientation, typically two or more piezoelectric elements joined face-to-face which produces differential expansion and bending. Transducers which exhibit significant expansion along more than one axis should be avoided in practicing this invention.

Although each single piezoelectric crystal has limitations on the displacement and force, these limitations can be partially overcome by increasing the number of crystals used, and by stacking them. For example, 100 thin (0.04 inch each) piezoelectric discs stacked in a cylindrical arrangement can produce a greater displacement than a single crystal of the sme size and shape when the power supply is voltagelimited. Operation with limited voltages is desirable for technical as well as safety reasons.

Greater aggregate force can be obtained by adding separate crystals (or stacks of crystals) alongside so that the transducers work in unison. For applications needing considerable displacement and force, such as the retrofitted VIBROSEIS truck discussed below, an array of about 10 stacked transducers, each consisting of 100 thin (0.04 inch) piezoelecric discs, could be used.

The transducers should be capable of vibrating across the higher frequency spectrum desired for seismic prospecting, typically 20 to 500 Hz, preferably 50–500 Hz. The crystal should preferably be capable of a displacement of as much as 1 millimeter at 20 Hz (or 0.1 mm at 50 Hz). In general it should be capable of simulating or superseding the vibratory characteristics of a VIBROSEIS, particularly at frequencies above 100 Hz. Superior signal resolution can be expected from the piezoelectric system at higher frequencies, compared to a hydraulic system, where efficiency degrades rapidly at frequencies above 100 Hz.

Published literature, such as a booklet on "Piezoelectric Ceramics" available from EDO Corporation, Western Division, Salt Lake City, Utah, can be helpful in choosing the piezoelectric transducers. The EDO booklet discusses the performance characteristics of its products and includes relevant information on element stacking, electrode characteristics, selection of materials and shapes, etc.

Signal Source

The signal to drive the piezoelectric transducers can be from a sinusoidal sweep signal generator of the type that is commonly used to generate sweep signals on VIBROSEIS equipment. Preferred signal generators are capable of generating a sinusoidal signal with an amplitude of plus or minus 10 volts at frequencies from 1 Hz to 1000 Hz.

The signal is typically fed to a power amplifier which in turn drives the transducers. The amplifier best suited for this application is a four quadrant bipolar amplifier, which can function as both a source and sink of the current produced. The amplifier can produce both negative and positive voltage, and negative and positive current, which may be either in-phase or out-of-phase with the driving voltage. Further information on selection or operation of such amplifiers can be found in the literature, including the Kepco Power Supplies "Applications Handbook & Catalog" (Kepco. Inc., 131-38 Sanford Ave., Flushing, N.Y. 11352 USA).

The power needed for operating the vibrator in the field is conveniently obtained from a generator mounted on a truck, although other sources could be used. The power required to vibrate a 4000 pound reaction mass, used in the example below, is about two kilowatts.

Plate

The plate can be of any material of sufficient thickness and rigidity to prevent flexion, such as steel. It is typically planar, but can be curved when desirable for special applications such as for placement against the walls of a borehole.

Accelerometers can be mounted on the reaction mass and plate to monitor the motion and hence the driving force delivered to the earth.

Surface Vibrator

A surface vibrator with multiple piezoelectric drivers can apply energy to the earth similarly to a conventional hydraulic VIBROSEIS unit, but with greater efficiency. This efficiency can result in decreased apparatus size, which is desirable for field use.

Figure 2:
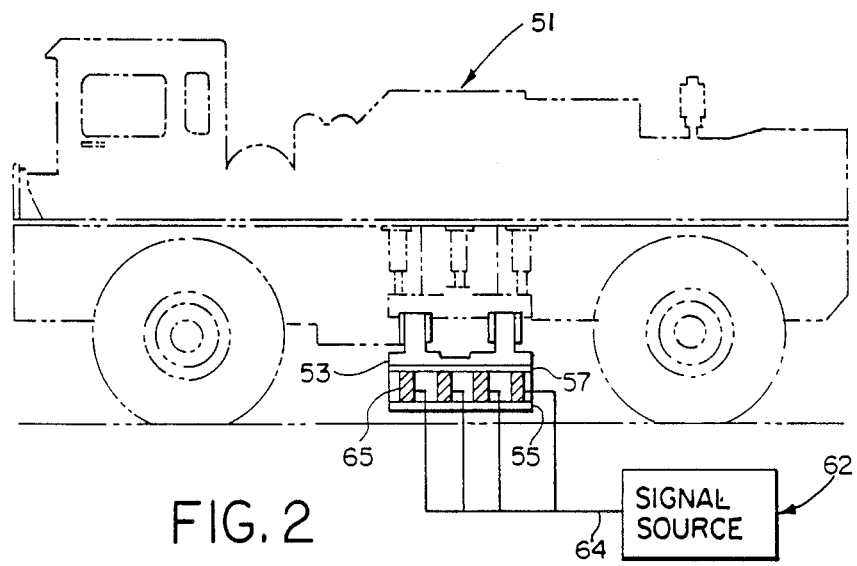
FIG. 2 depicts an apparatus for use as a surface vibrator which incorporates the existing controls and mass of a conventional vibrator truck.

A VIBROSEIS truck can also be retrofitted as shown in FIG. 2 to obtain the benefits of this invention at very little cost. The truck 51 is shown in broken lines, and its existing base plate 53 is shown in an extended position. A new base plate 55 is constructed which is preferably about the same dimensions as the truck base plate 43. A plurality of piezoelectric transducers 65 are sandwiched between new plate 55 and truck base plate 53, or between new plate 55 and an optional top plate 57. The piezoelectric transducers 65 are wired to accept signals from a signal source, 62 (e.g., a power generator, amplifier, and control) that can optionally be mounted on the truck. For operation, the truck lowers its base plate to contact the earth's surface and apply static force in the conventional manner, but the piezoelectric transducers provide the driving force instead of the truck's hydraulic system. For convenience only, the trademark VIBROSEIS shall be read to include all types of surface vibrator trucks.

Borehole Vibrator

A device useful for use within a borehole can comprise one or more piezoelectric transducers attached to one or more cylindrical plates with a tensional arm such as a spring or hydraulic piston. A heavy mass such as used on the surface may be included but is not absolutely necessary in this embodiment because sufficient pressure can be applied by holding the cylindrical plates against opposing sides of the borehole. Alternatively, a single plate could be used which extends to contact the borehole wall and holds the entire device firmly in place. The electrical signal is provided by a cable from the surface.

In operation, the device is lowered to the desired depth in the borehole, the plate are extended to contact the sides of the borehole, and current is applied to the piezoelectric transducer. Signal receivers can be placed at the surface or in one or more additional boreholes. The process can be repeated at other depths.

Figure 3:
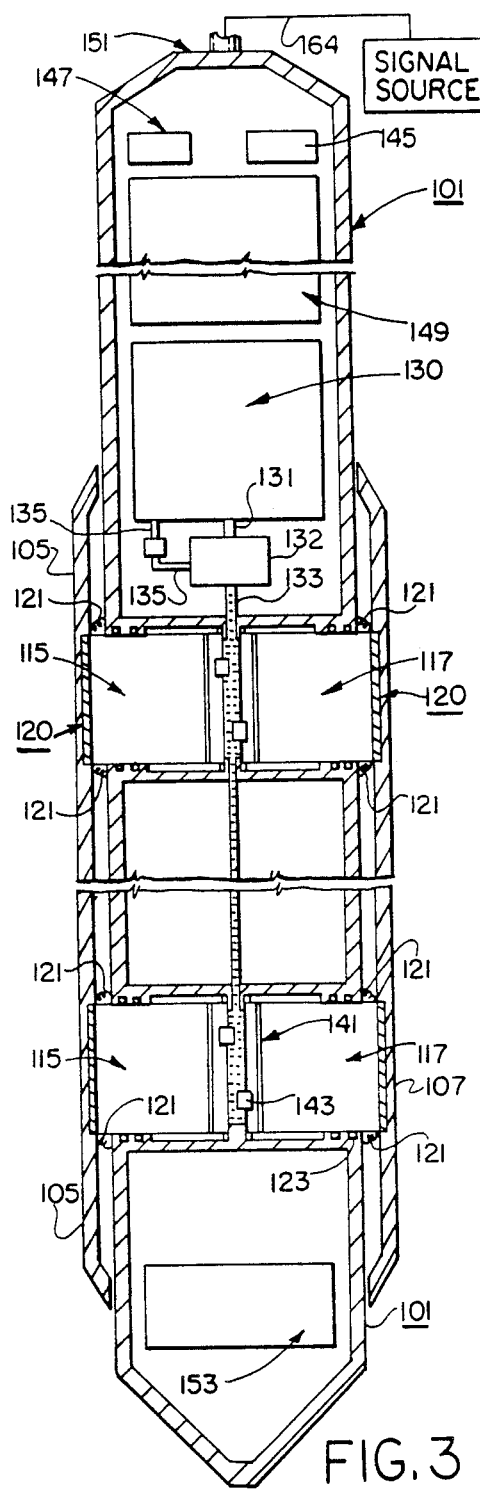
FIG. 3 is a cross-sectional diagrammatic view of an apparatus which can be suspended within a borehole to generate vibrations at selected subsurface locations.

FIG. 3 illustrates a device for transmitting seismic signals from within a borehole into the earth. The device can be roughly cylindrical in shape, about 5-10 feet long and 6 inches at its widest diameter, so that it can be lowered into a borehole of about 8 inches diameter. Its outer shell 101 is tapered at the lower, leading edge and the opposite end 151 has suitable attachments for support cables and entry ports (not shown) for electrical and control lines 164 leading to the earth's surface and the signal source 162.

Outside, and not directly attached to, shell 101 are two base plates 105 and 107, which are capable of moving away from the axis of the device in order to contact the walls of the borehole. The base plates 105 and 107 have a radius of curvature to conform to the curvature of the borehole. The arc of each base plate need not exceed, and is preferably less than, 90 radians.

In a preferred embodiment (not illustrated), the device is equipped with a second pair of base plates 106 and 108 (not shown) positioned at right angles to the axis and to the first pair of base plates. This embodiment allows the operator to sequentially or concurrently vibrate both pairs of plates to produce compressional waves, shear waves, or a combination.

The base plates 105 and 107 are attached by breakaway shoes 120 to pairs of piezoelectric transducers, 115 and 117 respectively. The shoes can be any conventional design to assure that the tool body can be detached from the base plate in case the tool becomes stuck in the borehole. Such design could consist of a weak mechanical link or a slip-on device, with a calibrated break-away force.

The base plate, shoe, and transducer move as a unit away from the axis of the device. The transducer, preferably cylindrically-shaped, moves through an opening defined by the shell 101, similarly to a piston. Sets of springs 121 attached to the exterior of shell 101 and the inteior of base plates 105 and 107 provide retracting force to withdraw the base plates in case of power failure.

The force to extend the base plates outwardly to contact the walls of a borehole is provided by a hydraulic system. Hydraulic fluid is contained in reservoir 130 at ambient pressure, and enters pump 132 via line 131. Fluid channel 133 communicates with the transducers 115 and 117, so that pressure can be applied to the transducers to force the base plates out.

O-rings 123 between the shell 101 and the transducers 115 and 117 provide a seal against leakage of the hydraulic fluid. A valve 134 is provided for relief of hydraulic pressure in the event of power failure to the device, and allows return of fluid to reservoir 130 via line 135.

Optional equipment that can be used with this device include pressure sensors 141 to monitor the dynamic force exerted on the borehole wall. Movement of the device itself can be measured by radial accelerometers 143 and a tangential accelerometer 145. A magnetometer 147 may be included to determine the azimuthal orientation of the tool in the borehole.

Space can be provided within the device for an electronics control module 149, or the device can be controlled primarily from controls at the earth's surface. A torque motor 153 can also be added to aid in orienting the device in the borehole.

Permanent Subsurface Vibrator

Figure 4:
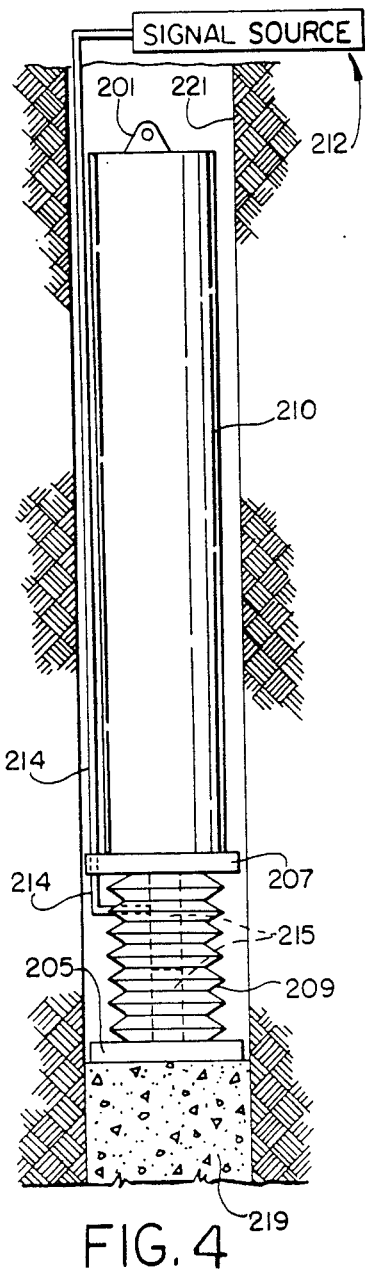
FIG. 4 is an elevational view of an apparatus designed for permanent placement below the earth's surface, the apparatus shown in a cross-section of a borehole. All of the above Figures are described in more detail below.

In another embodiment represented in FIG. 4, a piezeoelectric vibrator can be permanently placed at a specific subsurface location where it can be periodically activated to generate seismic signals. This offers the capability of repeatable seismic signals interrupted by large intervals of time, (e.g. months and years) which is impossible or impractical with other equipment. For example, conventional VIBROSEIS equipment may encounter disturbed surface conditions when attempting to duplicate seismic data acquired at a certain location at an earlier date. It is also difficult to position a surface vibrator in the identical spot repeatedly, particularly if few landmarks exist. In some areas, such as arctic tundra where the soil is too soft much of the year to support conventional surface vibrators, a permanently buried vibrator would permit data to be obtained throughout the year.

Periodic seismic data is useful in monitoring changes in hydrocarbon reservoirs, to detect changes in the reservoir over time. These data could be used, for example, to track the location of gas/oil or oil/water contact zones, and to permit more efficient production from a reservoir. Additionally, the progress of enhanced oil recovery procedures could be monitored.

FIG. 4 is a side view of a device for permanent subsurface burial, shown in a cross-section of a borehole with walls 221. A borehole is made to the desired depth in the earth. A quantity of cement 219 is optionally placed at the bottom of the borehole to form a more solid foundation. This cement is preferably about 20 feet or more in depth.

The device comprises a lower plate 205 and an upper plate 207 separated by a hollow cylinder 209. Within the cylinder are one or more piezoelectric elements, with two such elements 215 shown one on top of the other. The elements 215 are in firm contact with, and are preferably bolted or otherwise attached to, plates 207 and 205.

The walls of the cylinder 209 extend from the top and bottom plates (207 and 205) to completely enclose the elements 215. The walls are preferably pressure-tight to exclude subsurface fluids from the interior of the cylinder 209, and are sufficiently flexible to permit movement of the plates 207 and 205 when force is exerted by the piezoelectric transducers. The cylinder walls are preferably made of flexible steel, but can consist of polymers or other suitable materials, or combinations of them.

Once the device is placed in the borehole, additional cement or earth (not shown) can be placed in the borehole on top of plate 207 to provide an overburden weight to couple the device to the earth. It is preferred, however, to first attach an additional weight 210 to the top of plate 207 to assure that sufficient reaction mass is present when the device is in place, rather than rely solely on the overburden of materials added to the borehole. While cement layer 219 and weight 210 are optional, they are preferred to insure good coupling and consistent operation.

The signal can be provided by means of a cable 214 leading from the transducers 215 to a signal source 212 at the surface. The device is operated in the same manner as the surface piezoelectric vibrator discussed above.

The device is buried in a hole below the earth's surface. It can be located at about the location of a known hydrocarbon reservoir, or nearer the surface, depending upon the desired signal source location. The device is preferably placed below the weather layer or low-velocity layer, which is the shallow, near-surface layer characterized by considerably slower velocities of sound than deeper layers. As a general guideline, the devices could be placed at or below about 200 feet in depth.

Because of the shallow depths, it is convenient to use conventional water drilling equipment to make the holes for the permanently buried device. For this reason, the subsurface vibrators are preferably cylindrical with a diameter of about 8 inches or less. However, other shapes could be used.

Multiple vibrators can be buried to provide multiple single source locations. A geophone can also be placed on or in the buried vibrator, so that recording can be accomplished at one or more subsurface locations while a signal is generated at another subsurface location. This embodiment also offers the benefit of reduced noise from surface activities.

EXAMPLE

A piezoelectric transducer was assembled from commercially available components. The piezoelectric transducer, Model P-243-3 was manufactured by Physik Instrumente (PI) GmbH & Co. of Waldbronn, West Germany, and was obtained from Polytec Optronics, Inc., of Merrick, N.Y. The transducer was about 100 mm in length and 50 mm in diameter overall in a cylindrical shape. Each element in the transducer was about 1mm in thickness. The maximum displacement was approximately 60 microns over the length of 100 mm. The transducer is capable of delivering a maximum force of 2000 kg over this displacement range. In this experiment the device required about 1.0 kilowatts of RMS power (at up to 1500 volts at one amp, depending on frequency). Efficiency was estimated to be at least 90%.

A small, hydraulic, automotive jack about 6 inches tall was obtained from a Sears retail store. The base of the jack was firmly bolted to a $12 \times 12 \times \frac{3}{4}$ inch steel plate. the piezoelectric transducer was then bolted to the top of the jack and a second, smaller steel plate was bolted to the top of the transducer so that the transducer was sandwiched between the second steel plate and the top of the jack.

This apparatus was placed upright on a large concrete slab under an automobile weighting about 2000 lbs. The hydraulic jack was extended to lift the front left corner of the automobile, thus providing about 500 lbs. of load to the top plate to serve as a resistance force.

The piezoelectric transducer was driven with a Hewlett-Packard Model HP 3312 function generator capable of providing a 50-500 Hz signal, and was coupled to a Bruel and Kjaer Model 2713 ower amplifier capable of delivering 100 Volt RMS at 1 Amp RMS.

A first geophone was placed on the concrete slab about 19 feet from the jack and transducer. This geophone was connected to a lock-in amplifier, Princeton Applied Research Model 5301, and an oscillascope. Ambient noise at this location was measured at about 1 microvolt.

A fixed frequency signal was amplified and fed to the transducer, and the resulting vibration of the transducer and mass produced a noticeable vibration of the concrete slab above a frequency of 200 Hz.

A second geophone was placed above the transducer on top of the second steel plate. This second geophone was also moved to a rigid part of the automobile to obtain data from which the dynamic force due to the accelerating mass of the vehicle could be inferred.

Several observations and conclusions were made from a series of tests at different frequencies. The effectiveness of the piezoelectric transducers (i.e., the measured velocity at the surface of the transducer when it is loaded by the heavy vehicle) did not decresae when the load was applied. The voltage measured from the second geophone placed on top of the second steel plate (near the piezoelectric drive surface) was essentially the same as that measured at various rigid locations on the automobile. This observation is consistent with the manufacturer's claim that the transducers can put out a minimum force of 4400 lb.

The amplitude of the geophone signals ranged from about 0.2 to 2 mV p-p at 50-300 Hz at a distance of about 10 feet. The signal to noise ratio at 280 Hz was in excess of 1600 in a 1 Hz measurement bandwidth. The signal strength may be increased considerably by increasing the input electrical power, or by using multiple transducers. This can be compared to a typical monitoring geophone signal of 75 mV observed near a VIBROSEIS unit operating in the field.

I claim:

1. A vibrator for transmitting seismic signals into the earth, comprising
   at least one piezoelectric transducer capable of vibrating from 20 to 500 Hz,
   a means for supplying an electrical signal between 20 and 500 Hz to the transducer, a plate attached to the transducer,
   and a means for holding the transducer and plate firmly against the earth.

2. The vibrator of claim 1 for use within a borehole, in which the vibrator has a longitudinal axis for alignment with the length of the borehole, and the plate is affixed to the vibrator so as to permit the plate to be extended at right angles to said axis to contact the walls of the borehole.

3. The vibrator of claim 2 in which a second plate is also affixed to the vibrator opposite the first plate and at right angles to the longitudinal axis.

4. The vibrator of claim 3 in which a hydraulic system is employed to extend the plates to contact the walls of the borehole.

5. In a method for transmitting seismic signals into the earth wherein a plate is held in position against the earth at a first location, a force is applied to the plate to cause a signal of predetermined frequency between 20 and 500 Hz to be transmitted into earth, and the signal is received at a second location, the improvement comprising:
   generating said force with at least one piezoelectric transducer.

6. A method for transmitting seismic signals having a frequency between 20 and 500 Hz into the earth from within a borehole, the method comprising:
   (i) placing within the borehole a vibrator having a longitudinal axis aligned with the length of the borehole, the vibrator having at least one plate capable of being extended at right angles from said longitudinal axis and having a piezoelectric transducer attached to the plate;
   (ii) extending the plate from said axis and applying a force sufficient to hold said plate firmly against the walls of the borehole;
   (iii) supplying an electrical signal to energize the transducer to cause the plate to vibrate at a frequency between 20 and 500 Hz, thereby transmitting seismic signals into the earth.

7. The method of claim 6 in which the frequency is between 50 and 500 Hz.

8. The method of claim 7 in which the frequency is between 100 and 500 Hz.

9. The method of claim 6 in which the signal consists of a frequency sweeping sinusoidal signal within a range from 20 to 500 Hz.

10. The method of claim 6 in which the plate is extended by hydraulic means.

11. The method of claim 7 in which two opposing plates are extended to contact opposite sides of the borehole.

12. The method of claim 11 in which four plates are extended at right angles to the axis and to each other.

* * * * *